United States Patent [19]

Oehr

[11] Patent Number: 5,458,803
[45] Date of Patent: Oct. 17, 1995

[54] ACID EMISSION REDUCTION

[75] Inventor: Klaus Oehr, Vancouver, Canada

[73] Assignee: Dynamotive Corporation, Vancouver, Canada

[21] Appl. No.: 130,123

[22] Filed: Sep. 30, 1993

[51] Int. Cl.$^6$ ..................................................... C09K 3/00
[52] U.S. Cl. .............................. 252/192; 44/604; 127/32; 530/500; 554/178
[58] Field of Search ........................... 252/192; 554/178; 44/604; 127/32; 530/500

[56] References Cited

U.S. PATENT DOCUMENTS

| | | | |
|---|---|---|---|
| 1,538,269 | 5/1925 | Colas | 530/500 |
| 1,917,660 | 7/1933 | Martin et al. | 554/178 |
| 3,970,434 | 7/1976 | Gasior et al. | 44/604 |
| 4,259,085 | 3/1981 | Ban et al. | 44/604 X |
| 4,319,885 | 3/1982 | Brown | 44/604 |
| 4,505,776 | 3/1985 | Murray | 252/192 X |
| 4,615,871 | 10/1986 | Yoon | 423/243 |
| 4,728,393 | 3/1988 | Peel | 530/500 X |
| 4,786,485 | 11/1988 | Kirchgessner et al. | 252/192 X |
| 5,288,857 | 2/1994 | Aarsrud et al. | 530/500 |

OTHER PUBLICATIONS

Rodden, G., "The New Alchemy: Turning Waste into Oil and Chemicals", *Canadian Chemical News* 45(8):35–37 (1993).

Vogiatzis, et al., "The Characterization of Fast Pyrolysis Bio–Oils", Advances in Thermochemical Biomass Conversion, vol. 2, Blackie Academic & Professional, pp. 1095–1102 (1994).

Ye et al., "Desulfurization Tests of Sorbent E1 in a Bench–Scale Fluidized–Bed Coal Combustor", Coal Combustion Science and Technology of Industrial and Utility Applications, Hemisphere Publishing Corporation, New York, pp. 565–572 (1988).

Levendis, Y. A., "Catalysis of the Combustion of Carbonaceous Particles (Synthetic Chars and Coal) by Addition of Calcium Acetate", Journal of Energy anmd Fuels, Chapter 9 (1989).

Elliott et al., "Developments in Direct Thermochemical Liquefaction of Biomass: 1983–1990", Energy & Fuels, vol. 5, pp. 399–410 (1991).

Backman et al., "Economic Assessment of a Wood Fast Pyrolysis Plant", AITBC Conference, Interlaken, Switzerland (1992).

Piskorz et al., "Liquid Products From the Fast Pyrolysis of Wood and Cellulose", Research in Thermal Biomass Conversion, Elsevier Science Publishers, New York, pp. 557–571 (1988).

Ohtsuka et al., "Catalytic Gasification of Low–Rank Coals with Calcium Acetate", Elsevier Science Publishers, New York, pp. 253–271 (1991).

*Primary Examiner*—Richard D. Lovering
*Attorney, Agent, or Firm*—Morrison & Foerster

[57] ABSTRACT

A method of reducing acid emission from a flue gas produced by combustion of a sulphur-containing fuel. A pyrolysis liquor containing a thermolabile alkaline earth metal compound is introduced into a flue containing the flue gas. The alkaline earth metal compound is able to decompose at flue gas temperature to produce an alkaline compound able to react with sulphur dioxide in the flue gas. A liquor additive to inject into a flue gas resulting from a combustion of a sulphur containing fuel to reduce the acid content of the flue gas is also described. The liquor comprises a pyrolysis liquor, initially acidic but at least partially neutralized by basic alkaline earth metal compounds. The resulting liquor contains at least one thermolabile alkaline earth metal compound able to decompose at flue gas temperature to produce an alkaline compound able to react with sulphur dioxide. A method of producing the liquor is also described.

9 Claims, No Drawings

ACID EMISSION REDUCTION

FIELD OF THE INVENTION

This invention relates to a method of reducing acid emission from a flue, a liquor additive to inject into a flue gas to reduce acid emission and a method of producing the liquor.

DESCRIPTION OF THE PRIOR ART

Acid rain is a problem throughout the world. Acid rain affects the environment by reducing air quality, rendering lakes acid and killing vegetation, particularly trees. It has been the subject of international dispute. Canada and the United States have argued over the production of acid rain. Britain and Scandinavia are other antagonists.

In the main acid rain stems from sulphur dioxide produced in smoke stacks. The sulphur dioxide typically originates from the combustion of a sulphur containing fuel, for example coal. The sulphur dioxide is oxidised in the atmosphere to sulphur trioxide and the trioxide is dissolved to form sulphuric acid. The rain is thus made acid. The oxides of nitrogen also are a factor in producing acid in the atmosphere. The emission of oxides of nitrogen in the United States and Canada is about one fifth sulphur dioxide emissions. But that still means that millions of tons of oxides of nitrogen are fed to the atmosphere each year. Although it is believed that the production of sulphur dioxide has stabilized, larger emissions of the oxides of nitrogen are anticipated because of the increased use of fossil fuels.

With the passage of the International Clean Air Act amendments, such as issued in the United States in 1990, the curbing of acid emissions has become a priority. Planners for electrical utilities in particular are developing strategies for reducing emissions of sulphur dioxide and nitrogen oxides in the production of electrical and thermal power. The majority of fossil fuel used in power production contains sulphur which produces sulphur dioxide and hydrogen sulphide during combustion.

Gas desulphurization systems are known. The majority rely on simple basic compounds such as calcium carbonate, sodium carbonate and calcium hydroxide to react with the acidic sulphur containing species to produce non-volatile products such as calcium sulphite, calcium sulphate and sodium sulphate. Urea and ammonia have been used to react with oxides of nitrogen generated during fossil fuel combustion to produce non-toxic nitrogen gas but urea and ammonia are expensive.

Conventional alkaline adsorbents such as calcium carbonate and calcium hydroxide undergo thermal decomposition to calcium oxide at high temperature which reacts readily with the sulphur dioxide. However the adsorbents suffer from fouling problems. Calcium sulphite or calcium sulphate is formed at the surface of the calcium oxide particles. This results in substantial amounts of unreacted, alkaline calcium oxide being produced during flue gas desulphurization. These alkaline solid wastes are toxic and undesirable. Successful attempts to solve this problem have relied on particle abrasion achieved in fluidized bed combustion of fossil fuels. For example in the combustion of coal, calcium sulphite/sulphate surfaces can be partially ruptured to expose fresh calcium oxide substrate, which can undergo further reaction with the sulphur species.

The prior art has also described the use of aqueous alkali metal acetates, for example aqueous calcium acetate, calcium magnesium acetate and barium acetate, to act as carbon combustion accelerators and calcium oxide precursors but cost effective calcium desulphurization and combustion accelerator agents have not yet been found. Production of nitrogen oxides during fossil fuel combustion increases with combustion temperature and residence time. Increasing the combustion rate or decreasing the combustion temperature of fossil fuels decreases nitrogen oxide emissions but the prior art has not revealed how this can be achieved.

U.S. Pat. No. 4,615,871 to Yoon describes the reduction of the sulphur content of flue gas derived from combustion of a sulphur containing fuel. An aqueous solution containing an alkaline earth metal formate or acetate is sprayed into the flue gas. This process requires the expensive production of pure solutions of calcium formate and calcium acetate. As the solutions are not contacted with the sulphur containing fuel they cannot enhance fuel combustion rates to reduce nitrogen oxide emissions.

Techniques for the rapid pyrolysis of lignocellulosic—or starch—containing waste biomass to produce fuels with a high calorific value has been described. These fuels are acidic and corrosive to combustion equipment due to their high carboxylic acid content. The fuel value of such liquors is limited by this acidity.

It is known that aqueous solutions of calcium acetate can be used to improve the speed of coal gasification.

RELEVANT LITERATURE

Shanpei Ye, and Zhenzong Fu, "Desulfurization Test of Sorbent El in a Bench-Scale Fluidized-Bed Coal Combustor", Coal Combustion Science and Technology of Industrial and Utility Applications, Hemisphere Publishing Corporation, New York, pages 565–572 teach particle to particle abrasion in fluidized beds of fossil fuels.

Levendis, 1989, "Catalysis of the Combustion of Synthetic Char Particles by Various Forms of Calcium Additives", Journal of Energy and Fuel discusses the use of aqueous alkali metal acetates as combustion accelerators.

Elliot et al., 1990–1991, "Energy and Fuels", Volume 5, pages 399 to 410; Beckman, D., and Graham, R., "Economic Assessment of a Wood Fast Pyrolysis Plant", AITBC Conference, Interlaken, Switzerland 1992; Piskorz J., et al., "Liquid Products from the Fast Pyrolysis of Wood and Cellulose", Research in Thermal Biomass Conversion, Elsevier Science Publishers, New York, 1988, pages 557 to 571, all relate to the rapid pyrolysis of biomass to produce fuels.

Ohtsuka, Yasuo and Tomita, Akira, 1991, "Catalytic Gasification of Low-Rank Coals with Calcium Acetate", and "Calcium Magnesium Acetate, An Emerging Bulk Chemical for Environmental Applications", Elsevier Science Publishers, New York, pages 253 to 271, discuss use of calcium acetate in coal gasification.

SUMMARY OF THE INVENTION

The present invention seeks to produce a method of reducing acid emission from a flue, a liquor useful in flue gas combustion and a method of producing that liquor, all of which avoid the prior art problems.

Accordingly, and in a first aspect, the present invention is a method of reducing acid emission from a flue gas produced by combustion of a sulphur-containing fuel, the method comprising introducing into a flue containing the flue gas, a pyrolysis liquor containing a thermolabile alkaline earth metal compound able to decompose at flue gas temperature to produce an alkaline compound able to react with sulphur dioxide.

Preferably the pyrolysis liquor is incorporated into the fuel but the pyrolysis liquor containing the thermolabile compound may be injected into the flue.

The fuel may be, for example, coal, petroleum tar or pitch.

In a preferred embodiment the pyrolysis liquor is derived from a feed stock containing cellulose, lignin or starch. The pyrolysis liquor is usually acidic and is at least partially neutralized by a basic alkaline earth metal compound. The acidic components of the pyrolysis liquor, typically carboxylic acids, and the basic alkaline earth metal compound, react to produce the thermolabile compound.

The basic compound may be an alkaline earth metal oxide, hydroxide of carbonate. Calcium carbonate is preferred for cheapness and availability.

It may be desirable to oxidize the at least partially neutralized pyrolysis liquor. Oxidation can oxidize carbonyl species contained in the pyrolysis liquor, for example aldehyde, to a carboxylic acid, able to react with the alkaline earth metal compound. A desirable oxidizing agent is oxygen, typically introduced by aeration of the at least partially neutralized pyrolysis liquor.

In a further aspect the invention provides a liquor additive to inject into a flue gas resulting from the combustion of a sulphur containing fuel to reduce the acid content of the flue gas, the liquor comprising a pyrolysis liquor, initially acidic, at least partially neutralized by a basic alkaline earth metal compound, whereby the liquor contains at least one thermolabile alkaline earth metal compound able to decompose at flue gas temperature to produce an alkaline compound able to react with sulphur dioxide.

In yet a further aspect the invention is a method of producing a liquor containing at least one thermolabile compound, able to decompose at the temperature of a flue gas to produce alkaline compounds able to react with sulphur dioxide in the flue gas, the method comprising at least partially neutralizing an acidic pyrolysis liquor with a basic alkaline earth metal compound.

In the invention the simple alkaline earth metal compounds that are added to pyrolysis liquor act with various carboxylic acids present in the liquor to produce, for example, carboxylates, phenoxides, saccharides and the like. All these alkaline earth metal organic compounds undergo thermal decomposition to yield carbonates, bicarbonates, hydroxides and oxides on heating over a wide range of temperatures after the treated pyrolysis liquor has been mixed with a sulphur-containing fuel.

Thermal decomposition of the organic salts, for example calcium salts, produces higher surface area calcium oxide than has been achieved from non-organic metal salts, such as calcium carbonate. It is believed that this is due to the abrasive and turbulent action of gases such as carbon dioxide and water generated during the thermal decomposition. The effect is particularly useful for rupturing sulphite and sulphate films fouling the oxide adsorbents, such as calcium oxide, used in sulphur dioxide removal during fossil fuel combustion. Furthermore the moles of gas evolved per mole of alkali earth metal oxide, hydroxide or carbonate during thermal decomposition of the alkaline earth metal salts derived from biomass pyrolysis liquors, is much higher than the amount of gas produced from conventional sources. The following equations illustrate this fact:

Calcium carbonate. Only 1 mole of gas evolved per mole of calcium oxide generated $$CaCO_3 \rightarrow CaO + CO_2$$

Calcium glycolate 5 Moles of gas evolved per mole of metal oxide generated $$Ca(HO-CH2-COO)_2 + \tfrac{1}{2} O_2 \rightarrow CaO + 2CO_2 + 3H_2O$$

In the absence of oxygen (e.g. gasification), calcium oxide or other species can still be generated with the evolution of gas by reactions such as the following:

Calcium acetate $$Ca(CH_3COO)_2 \rightarrow CaO + CH_3-CO-CH_3 + CO_2 \; _{acetone}$$

Sulphur containing fuels which are hydrophobic in nature have a greater ability to absorb alkali metal salts from pyrolysis liquors, which have a hydrophobic as well as hydrophilic component, unlike conventional aqueous solutions of alkaline earth carboxylate salts, such as calcium acetate and calcium formate, which only have a hydrophilic component.

Absorption of hydrophobic plus hydrophilic alkaline earth metal salts such as those derived from calcium will increase the speed of coal combustion thereby reducing nitrogen oxide emissions.

Deacidification of the biomass pyrolysis liquor with alkaline earth metal salts increases its fuel value by reducing or eliminating the corrosive nature of the liquor.

The combination of alkaline earth metal salts with biomass pyrolysis liquor represents a relatively inexpensive source of alkaline earth containing additive for reducing sulphur dioxide and nitrogen oxide during sulphur-containing fuel combustion or gasification.

The following examples describe the invention:

EXAMPLE 1

Preparation of Alkaline Earth Salt Liquors

An alkaline earth salt liquor (e.g. calcium carbonate) is mixed with an acidic biomass pyrolysis liquor to produce a hydrophobic/hydrophilic solution, or solutions (e.g. organic hydrophobic solution plus aqueous hydrophilic solution) or suspension of alkaline earth salts (e.g. calcium propionate, calcium glycolate, calcium formate, calcium acetate, calcium lactate, calcium phenoxides, calcium saccharides, etc.).

EXAMPLE 2

Preparation of Alkaline Earth Salt Liquors

Pyrolysis liquor is aerated in the presence of alkaline earth metal compounds such as carbonates, hydroxides, or oxides to oxidize or disproportionate some or all of the carbonyl species contained in the pyrolysis liquors, such as aldehydes, to carboxylic acid species which can form salts such as those described in Example 1. Examples of these oxidation and disproportionation products could include the following:

Formaldehyde→formic acid

Hydroxyacetaldehyde→glycolic acid

Methyl glyoxal→pyruvic acid

Aromatic aldehydes→phenols or aromatic carboxylic acids

EXAMPLE 3

Preparation of Alkaline Earth Salt Liquors in the Presence of Fossil fuels

Biomass pyrolysis liquor is mixed with alkaline earth metal compounds(s) in the presence of sulphur containing fossil fuel such as powdered coal, with or without aeration, prior to combustion or gasification. The purpose of this approach is to increase alkaline earth compound adsorption or decomposition of acidic surface coal species or those contained in the pyrolysis liquor.

EXAMPLE 4

In addition to the above procedure, the biomass pyrolysis liquor mixed with alkaline earth metal compounds, as described in Example 3, may be injected directly into the flue, subsequent to the combustion, to achieve the desired neutralization. The only requirement is that the flue gas be hot enough to cause the breakdown of the organic compounds into simple basic inorganic compounds able to neutralize the sulphur compounds.

Although the forgoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. A liquor additive to inject into a flue gas resulting from the combustion of a sulphur-containing fuel to reduce the acid content of the flue gas, the liquor additive comprising a pyrolysis liquor, which is initially acidic due to the presence of one or more acidic components and is at least partially neutralized by a basic alkaline earth metal compound, whereby the liquor contains at least one thermolabile alkaline earth metal compound which:
   a. is formed by the reaction of said one or more acidic components with said basic alkaline earth metal compound; and
   b. is able to decompose at flue gas temperature to produce an alkaline compound to react with sulphur dioxide.

2. A liquor additive as claimed in claim 1 in which the pyrolysis liquor is derived from a feed-stock containing cellulose, lignin or starch.

3. A liquor as claimed in claim 1 in which the basic alkaline earth metal compound is an alkaline earth metal oxide, hydroxide or carbonate.

4. A liquor as claimed in claim 3 in which the basic alkaline earth metal compound is calcium carbonate.

5. A method of producing a liquor additive containing at least one thermolabile compound, which is able to decompose at the temperature of a flue gas to produce alkaline compounds able to react with sulphur dioxide in the flue gas, the method comprising at least partially neutralizing an acidic pyrolysis liquor, containing one or more acidic components, with a basic alkaline earth metal compound, wherein said one or more acidic components react with said basic alkaline earth metal compound to form said thermolabile compound.

6. A method as claimed in claim 5 in which the basic compound is an alkaline earth metal oxide, hydroxide or carbonate.

7. A method as claimed in claim 6 in which the basic compound is calcium carbonate.

8. A method as claimed in claim 5 including oxidizing the alkaline pyrolysis liquor.

9. A method as claimed in claim 8 in which the oxidation is carried out with air.

* * * * *

REEXAMINATION CERTIFICATE (3825th)

United States Patent [19]
Oehr

[11] B1 5,458,803
[45] Certificate Issued Aug. 3, 1999

[54] ACID EMISSION REDUCTION

[75] Inventor: Klaus Oehr, Vancouver, Canada

[73] Assignee: Dynamotive Corporation, Vancouver, Canada

Reexamination Request:
No. 90/004,878, Dec. 23, 1997

Reexamination Certificate for:
Patent No.: 5,458,803
Issued: Oct. 17, 1995
Appl. No.: 08/130,123
Filed: Sep. 30, 1993

[51] Int. Cl.[6] ................................................ C09K 3/00
[52] U.S. Cl. ........................... 252/192; 44/604; 127/32; 530/500; 554/178
[58] Field of Search ............................. 252/192; 44/604; 530/500; 127/32; 554/178

[56] References Cited

U.S. PATENT DOCUMENTS

| | | | |
|---|---|---|---|
| 3,970,434 | 7/1976 | Gasior et al. | 44/604 |
| 4,259,085 | 3/1981 | Ban et al. | 44/604 X |
| 4,615,871 | 10/1986 | Yoon | 423/243 |
| 5,264,623 | 11/1993 | Oehr et al. | 562/515 |

OTHER PUBLICATIONS

Girard A. Simons, "White Paper for Combined $No_x/SO_x$ Control in Coal Fired Utilities Using Biomass Waste Feedstock," May 1992.

K.H. Oehr and G. Barrass, "Biomass Derived Alkaline Carboxylate Road Deicers," The Chameleon Press Limited, London, U.K., May 1992.

*Primary Examiner*—Richard D. Lovering

[57] ABSTRACT

A method of reducing acid emission from a flue gas produced by combustion of a sulphur-containing fuel. A pyrolysis liquor containing a thermolabile alkaline earth metal compound is introduced into a flue containing the flue gas. The alkaline earth metal compound is able to decompose at flue gas temperature to produce an alkaline compound able to react with sulphur dioxide in the flue gas. A liquor additive to inject into a flue gas resulting from a combustion of a sulphur containing fuel to reduce the acid content of the flue gas is also described. The liquor comprises a pyrolysis liquor, initially acidic but at least partially neutralized by basic alkaline earth metal compounds. The resulting liquor contains at least one thermolabile alkaline earth metal compound able to decompose at flue gas temperature to produce an alkaline compound able to react with sulphur dioxide. A method of producing the liquor is also described.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 5 are determined to be patentable as amended.

Claims 2–4 and 6–9, dependent on an amended claim, are determined to be patentable.

New claims 10–18 are added and determined to be patentable.

1. A liquor additive to inject into a flue gas resulting from the combustion of a sulfur-containing fuel to reduce the acid content of the flue gas, the liquor additive [comprising] *consisting essentially of* a *biomass* pyrolysis liquor *containing both a hydrophobic phase and a hydrophilic phase, each containing at least one thermolabile alkaline earth metal compound*, which is initially acidic due to a presence of one or more acidic components and is at least partially neutralized by a basic alkaline earth compound, whereby the liquor contains at least one thermolabile alkaline earth metal compound which:
   a. is formed by the reaction of said one or more acidic components with said basic alkaline earth metal compound; and
   b. is able to decompose at flue gas temperature to produce an alkaline compound to [react with sulfur dioxide] *reduce nitrogen and sulfur oxides*.

5. A method of producing a liquor additive containing at least one thermolabile compound, which is able to decompose at the temperature of a flue gas to produce alkaline compounds able to [react with sulfur dioxide] *reduce nitrogen and sulfur oxides* in the flue gas, the method [comprising] *consisting essentially of* at least partially neutralizing an acidic *biomass* pyrolysis liquor [containing] *that contains both a hydrophobic phase and a hydrophilic phase and* one or more acidic components *in each*, with a basic alkaline earth metal compound, where said one or more acidic components, *present in each phase,* react with said basic alkaline earth metal compound to form said thermolabile compound *in each phase*.

10. *A liquor additive to inject into a flue gas resulting from the combustion of a sulfur-containing fuel to reduce the acid content of the flue gas, the liquor additive comprising a hydrophobic phase and a hydrophilic phase of a biomass pyrolysis liquor, which is initially acidic due to a presence of one or more acidic components and is at least partially neutralized by a basic alkaline earth compound, the hydrophobic phase and the hydrophilic phase of the pyrolysis liquor each containing at least one thermolabile alkaline earth metal compound which:*
   *A) is formed by the reaction of said acidic components with said basic alkaline earth metal compound; and*
   *B) is able to decompose at flue gas temperature to produce an alkaline compound able to reduce nitrogen and sulfur oxides.*

11. *A method of producing a liquor additive containing thermolabile compounds, able to decompose at the temperature of a flue gas to produce alkaline compounds able to simultaneously reduce nitrogen and sulfur oxides in the flue gas, the method comprising at least partially neutralizing an acidic pyrolysis liquor having a hydrophilic phase and a hydrophobic phase each containing one or more acidic components, with a basic alkaline earth metal compound, where said one or more acidic components react with said basic alkaline earth metal compound to form said thermolabile compounds in the hydrophilic phase and in the hydrophobic phase.*

12. *A liquor additive as claimed in claim 10 in which the pyrolysis liquor is derived from a feed-stock containing cellulose, lignin or starch.*

13. *A liquor additive as claimed in claim 10 in which the basic alkaline earth metal compound is an alkaline earth metal oxide, hydroxide or carbonate.*

14. *A liquor additive as claimed in claim 13 in which the alkaline earth metal compound is calcium carbonate.*

15. *A method as claimed in claim 11 in which the basic compound is an alkaline earth metal oxide, hydroxide or carbonate.*

16. *A method as claimed in claim 15 in which the basic compound is calcium carbonate.*

17. *A method as claimed in claim 11 including oxidizing the alkaline pyrolysis liquor.*

18. *A liquor additive as claimed in claim 17 in which the oxidation is carried out with air.*

\* \* \* \* \*